Oct. 8, 1963     M. F. PETERS     3,106,414
FLEXIBLE ROTARY SEALS AND BELLOWS ASSEMBLIES
Filed Dec. 3, 1958     3 Sheets-Sheet 1
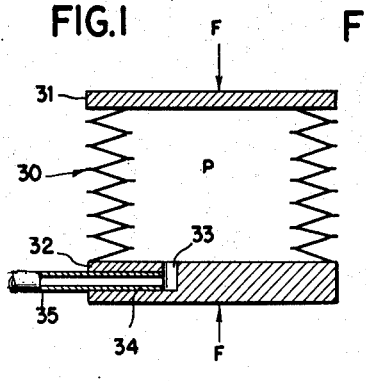
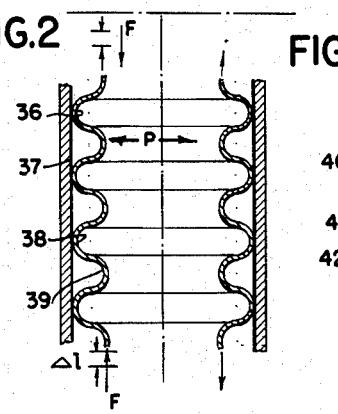
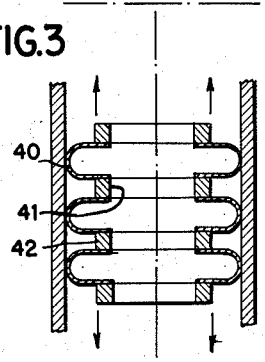
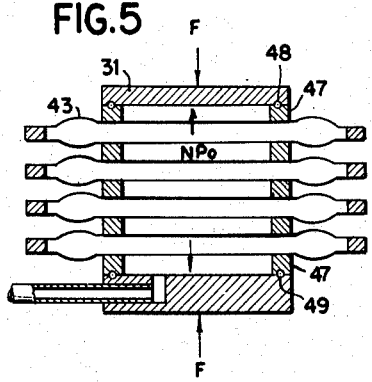
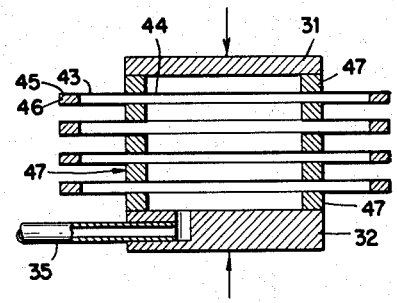
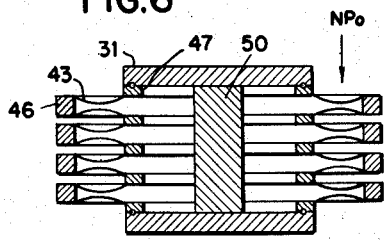
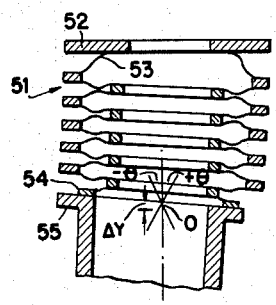
INVENTOR.
Melville F. Peters
BY
ATTORNEY

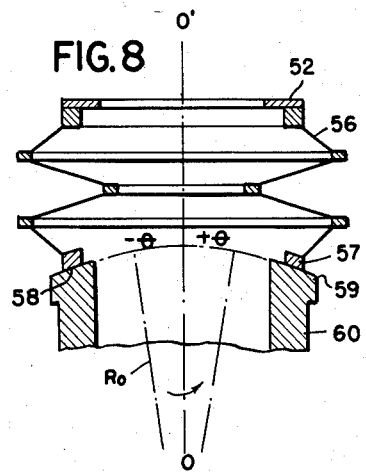
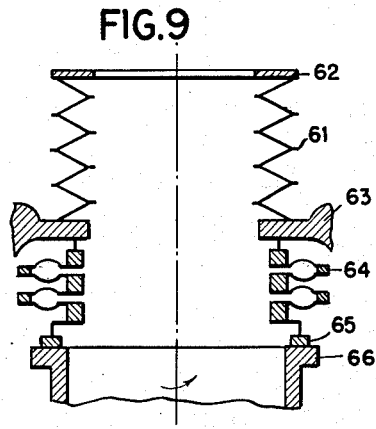
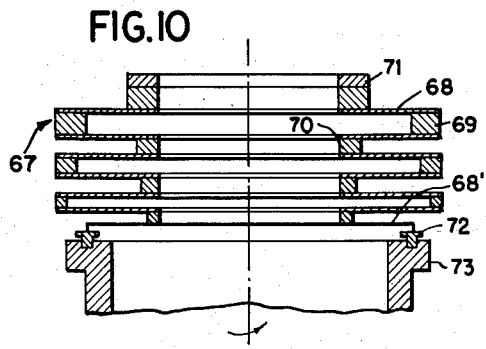
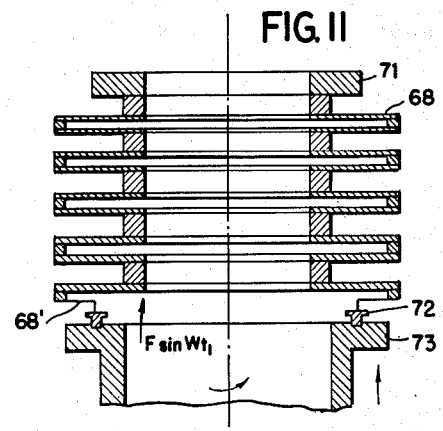
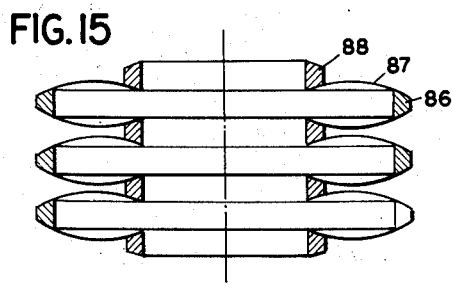
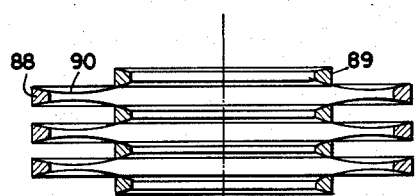
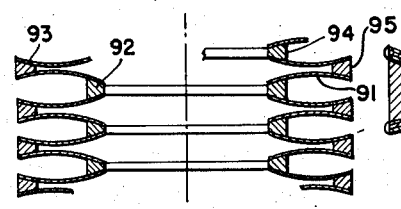

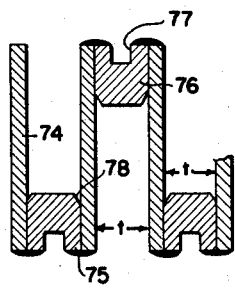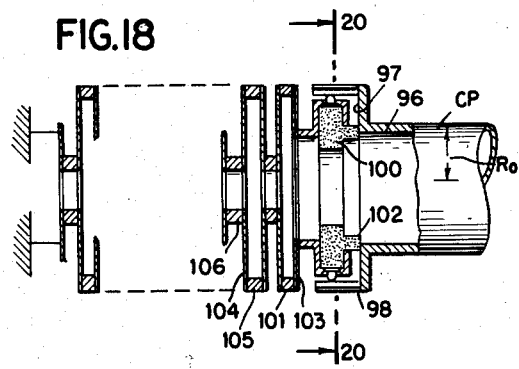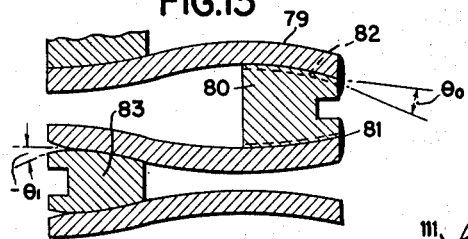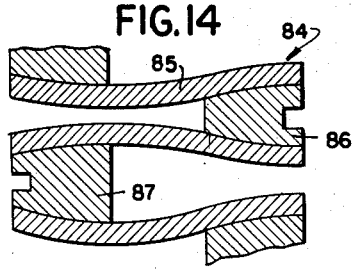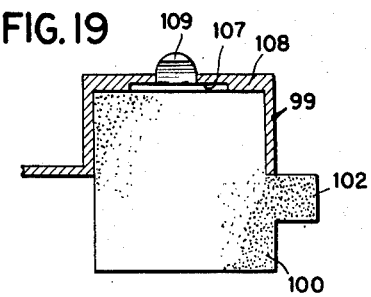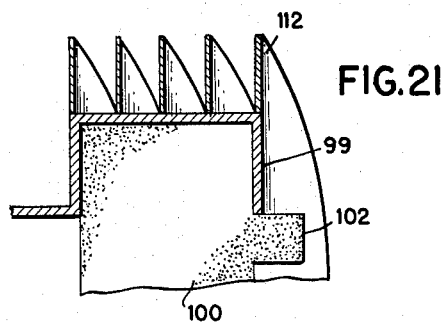

United States Patent Office 3,106,414
Patented Oct. 8, 1963

3,106,414
FLEXIBLE ROTARY SEALS AND BELLOWS ASSEMBLIES
Melville F. Peters, Livingston, N.J., assignor of fifty percent to Joseph J. Mascuch, Millburn, N.J.
Filed Dec. 3, 1958, Ser. No. 777,902
6 Claims. (Cl. 285—226)

This invention relates to flexible rotary seals and specifically such as employ metal bellows assemblies therein to restrict the flow of fluids between the contacting surfaces.

Where it is desired to conduct fluids through elements, one of which is moving with respect to the other in a rotary fashion, it is necessary to employ a rotary seal. Presently known seals of this type employ a piston spring and O ring in combination to achieve the desired results. However, as ambient temperatures are increased and it becomes necessary to operate such devices under extreme conditions of temperature, pressure, and vibrations, presently known structures have been found inadequate.

Accordingly, it is an object of the present invention to provide rotary seal assemblies which will continue to function under extreme conditions of ambient temperature, pressure, vibrations and shock.

Another object of the present invention is to provide a flexible fluid seal which exerts a force parallel to its longitudinal axis, proportional to the applied pressure.

Still another object of the present invention is to form a metal bellows structure which will have the performance characteristics of a piston.

An object of the present invention is to provide a flexible rotary seal, employing metal bellows, which is symmetrical in a plane normal to the axis of the bellows.

A further object of the present invention is to provide a flexible rotary seal employing metal bellows in which the spring rate and hysteresis of the bellows, is kept within the necessary limits.

A feature of the present invention is its use of a bellows having the characteristics of a piston in a rotary seal.

Another feature of the present invention is its use of convex and concave mating surfaces between the fixed and movable members to limit the movement of the elements with respect to each other by giving the surfaces a radius of curvature equal to the distance the two surfaces are from the center of rotation.

A still further feature of the present invention is its use of two bellows where a large axial displacement is encountered, one of which becomes the flexible member in contact with the rotating surface and the other of which is attached to a non-rotating part of the structure which has the same axial displacement as the rotating element.

Another feature of the present invention is its use of very light bellows in that portion of the flexible element which contacts the rotating sealing surface.

A feature of the present invention is its use of a rotary seal in which the effective mass decreases from the end attached to the fixed member structure to that which is attached to the sealing member adjacent the rotating portion of the assembly.

Another feature of the present invention is to add mass to the bellows assembly without increasing the spring rate so that the natural frequency of the bellows will be very low.

The invention consists of the construction, combination and arrangement of parts, as herein illustrated, described and claimed.

In the accompanying drawings, forming a part hereof are illustrated several embodiments of the invention, and in which:

FIGURE 1 is a somewhat diagrammatic cross sectional view of a bellows test unit for determining the performance characteristics of various types of assemblies.

FIGURE 2 is a somewhat diagrammatic cross sectional view of a bellows supported by a rigid tubular structure illustrating the various principles of bellows behavior.

FIGURE 3 is a somewhat diagrammatic cross sectional view of a prior art bellows carried within a rigid tubular structure illustrating further principles of bellows behavior.

FIGURE 4 is a somewhat diagrammatic cross sectional view of a bellows assembly prior to forming in accordance to the present invention.

FIGURE 5 is a view similar to FIGURE 4 showing the bellows following the application of fluid pressure within the bellows assembly.

FIGURE 6 is a view similar to FIGURE 5 showing the manner in which a bellows may be formed from the assembly illustrated in FIGURE 4, by the application of external hydraulic pressure to the bellows plates.

FIGURE 7 is a somewhat diagrammatic view in longitudinal section showing the application of a bellows to a rotary seal an embodiment of the present invention.

FIGURE 8 is another view in longitudinal section showing a further embodiment of a rotary seal in which the mating surfaces are provided with complimentary concave and convex seats to reduce the relative displacement between the members.

FIGURE 9 is a somewhat diagrammatic cross section of a rotary seal employing two bellows assemblies.

FIGURE 10 is a somewhat diagrammatic view in longitudinal cross section showing a rotary seal construction employing a bellows formed of plates welded to rings of graduated mass.

FIGURE 11 is a view somewhat similar to FIGURE 10 in which the bellows assembly is formed of plates having successively thicker elements.

FIGURE 12 is a fragmentary view greatly enlarged showing the construction of still another bellows formed of plates and ring-like separator members.

FIGURE 13 is a fragmentary cross sectional view greatly enlarged of a bellows assembly employing plates and separating rings capable of withstanding pressure differentials of several thousand pounds per square inch.

FIGURE 14 is a view similar to FIGURE 13 showing a bellows having externally applied pressure.

FIGURE 15 is a somewhat diagrammatic longitudinal section taken through a bellows formed of plates held together by tapered rings to increase the ability of the bellows to withstand pressure.

FIGURE 16 is a view similar to FIGURE 15 in which the pressure is applied externally.

FIGURE 17 is a view similar to FIGURES 15 and 16, in which a bellows is built up of two or more plates welded together at their ends to tapered rings to form a multi-ply bellows assembly.

FIGURE 17-a, is an enlarged fragmentary cross-sectional view of the bellows shown in FIGURE 17.

FIGURE 18 is a view of a rotary seal assembly in longitudinal cross section showing a cooling device for the sealing surfaces.

FIGURE 19 is a fragmentary view somewhat enlarged showing the manner in which air is drawn past the ring to cool the assembly.

FIGURE 20 is a view taken on line 20—20 in FIGURE 18, somewhat enlarged.

FIGURE 21 is still another embodiment of a rotary seal cooling structure.

Referring to the drawings and particularly to FIGURE 1, 30 indicates a bellows assembly welded at one end to a cap 31 and at its opposite end to a base 32. The base 32 is provided with communicating vertical and horizontal bores 33, 34, which lead from the interior of the bellows 30 to the outside of the base 32. A pipe or conduit 35 is inserted in the bore 34 for the purpose of introducing or removing air or fluid from the interior of the bellows 30. By placing the unit shown in FIGURE 1, between the heads of a universal testing machine it is possible to plot the relation between the forces F and the applied pressure P.

With the bellows 30 held at its free length, an incremental hydrostatic pressure was applied to the bellows assembly through the pipe 35. The forces F were then measured and recorded. A plot of the pressure versus force relationship for a conventional type of bellows such as shown in FIGURE 1, as well as the many other types of conventional bellows which were studied proved that the acting effective or piston area of the bellows will increase in pressure. A typical example of measurements made on a bellows having an outside diameter of approximately 8.5 inches, indicated an increase in the effective diameter of 0.3 inch. These apparent changes in effective diameter and effective areas were made by noting the pressure force relationship at pressures of 10 or 15 p.s.i. and again noting this relationship at 150 p.s.i. This change in the action of the bellows over a pressure range of 0 to 150 p.s.i., raised the end thrust of the bellows by 1000 pounds over the predicted end thrust which had been calculated from measurements made at 15 p.s.i. Since the sealing surfaces of a rotary seal must operate at forces which remain fairly constant over wide changes in pressure to prevent either leakage at the surfaces or rapid wear, it was apparent that none of the bellows tested could replace the presently used piston-spring assembly which had not only become troublesome but useless at very high temperatures.

Measurement made on the conventional metal bellows over the pressure range of 15 to 150 p.s.i. indicated that the change in diameter was negligible, so that the end thrust which is referred to in the art as a change in diameter, was actually caused by stresses which were taking place in the bellows. Now the effective area of a bellows is equal to the:

$$(OD+ID)^2 \times \frac{\pi}{16} = \text{Effective bellows area}$$

where $OD$=outside diameter of the bellows, $ID$=inside diameter of the bellows.

While the true expanation for these changes is not known, the procedure followed in changing the conventional type of bellows 36 shown in FIGURE 2 to the type of bellows 43 shown in FIGURES 4, 5, 6, etc., produced a bellows which had the same relationship between operating pressure and end thrust as a piston. Consequently it is now possible to replace a spring-piston assembly with a bellows.

Referring to FIGURE 2, it follows that an increase in pressure P, will cause the concave portion 39 of bellows 36 to stretch and if the pressure P is made great enough, the concave portion will continue to stretch until it has the same diameter as the convex portion 38, so that the limit, the bellows will be deformed until it forms a smooth tube having an outer diameter equal to the inner diameter of 37.

The effective area of the bellows which is known to be:

$$\text{Effective area} = (OD+ID)^2 \frac{\pi}{16}$$

must according to the equation increase with an increase of the inside diameter of the bellows, and this is exactly what takes place with a stretching of the bellows. The outside diameter as shown in FIGURE 2, would stretch if its diameter were not limited by tube 37.

During any portion of the forming process which is really a distortion of the bellows, the overall length of the bellows 36 must be increased, and the increase in length 7 will be a complicated function of the increase in diameter of the concave portion of the bellows. If the end of the bellows are confined during this transverse stretch of the bellows, the forces developed at the end of the bellows will be a complicated function of the pressure P. This explains in part the large forces developed between the sealing surfaces of a rotary seal and why it has been referred to in the trade as an increase in effective area.

The bellows assembly in FIGURE 3 showed a smaller increase in end thrust per unit change in pressure than the conventional bellows in FIGURE 2, since the inner diameter 41 of bellows 47 was reinforced with the rings 42. These tests show that while the modified bellows in FIGURE 3 will indicate a small change in effective area over the same pressure range as the bellows shown in FIGURE 2, the bellows in FIGURE 3 could not replace the spring-piston assembly over the 0 to 150 p.s.i. range.

Referring to FIGURE 4 there is shown the manner in which a bellows made in accordance with the present invention is formed. A series of plates 43 having central openings 44 therein are welded together in pairs by welding their outer peripheries 45 to rings 46. The pairs are then welded at their inner peripheries to smaller rings 47. The plates are then substantially perpendicular to the longitudinal axis of the bellows. The entire assembly is then placed between a cap 31 and a base 32 and subjected to a forming pressure greater than the proposed operating pressure for the bellows. The forming pressure is introduced into the pipe 35 in the hereinabove described manner. When the bellows is pressurized internally the sum of the forces acting on each plate will be parallel to the axis of the bellows so that the bellows will exhibit when finished the characteristics of a piston. As the pressure is increased the plates will be formed hydrostatically so as to have a parabolic cross sectional shape as shown in FIGURE 5. It has been found that plates formed in this manner develop fewer stresses than those made by stamping with some other surface curvature. The spring rate of the bellows depends upon the radius of curvature of the individual plates 43. The parabolic shape assumed by the plates 43 can not be described by a single radius of curvature and therefore the spring rate of bellows which are formed by a fluid pressure can not be calculated by any of the known equations and must therefore be formed experimentally.

In forming a bellows according to the present invention, the top and bottom ring members 47 may be placed between the cap 31 and the base 32 and sealed by means of O-rings 48, 49, respectively. The cap 31 and base 32 may be clamped in a press (not shown) which exerts a force F on the cap and base great enough to hold the assembly together when the forming pressure is applied through the pipe 35. The forming pressure in FIGURE 5 has been indicated as $NP_0$. The pressure $P_0$ is the working pressure and $N=1, 2, 3$, etc. When the stresses in the plates must be kept low and the spring rate is of secondary importance N is usually taken as 5, so that the working pressure is only 20% of the forming pressure. When the spring rate is of primary importance, N must be selected so that the correct spring rate is obtained. It should be pointed out that pairs of the bellows plates must be symmetrical with respect to a plane passed normal to the axis of the bellows and it is preferable to have these bellows plates either flat, or to have the curvature of one plate equal to the curvature of its opposed plate but opposite in sign.

Where the high pressure is to be applied to the outer surface of the bellows, it is necessary to form a bellows in accordance with the showing of FIGURE 6. Here again, the outer peripheries of the plates 43 are joined to the rings 46 and the inner peripheries are joined to ring 47.

Where the pressure is to be applied internally the inner rings 47 are formed with a thicker cross sectional mass than the outer rings 46. Where the pressure is to be applied externally the converse is true and the external rings 46 are made heavier than the internal rings 47.

A post 50 is placed within the bellows of FIGURE 6 between the cap 31 and the base 32 before the said cap and base are placed upon the rings 48. A forming pressure $NP_0$ is then applied to the exterior surfaces of the assembly until the parabolic shape of the plates 43 is achieved. It will be noted that the plates 43 under the influence of the exterior pressure bow inwardly as compared with the bellows shown in FIGURE 5 where the pressure was applied to the interior of the assembly. The advantages of using bellows such as have been described in connection with FIGURES 5 and 6, will be apparent from examination of FIGURE 7.

Referring to FIGURE 7 there is shown a rotary seal assembly consisting of a bellows 51 similar in construction to that shown in FIGURE 5. The bellows 51 is attached to a support 52 at 53. The end of the bellows 51 opposite the support 52 is secured to a sealing ring 54. Both ends of the bellows 51 are secured to the support 52 and sealing ring 54 at their center of pressure. When bellows are secured to end fittings such as the support 52 and the sealing ring 54 at their center of pressure, the forces on the support 52 and sealing ring 54 imposed by the bellows 51 will be independent of the internal or external pressures on the assembly.

The sealing ring 54 rests upon a rotating element 55.

Since all rotating bodies will vibrate or oscillate, the bellows 51 must accommodate rotation of the element 55 about the point indicated by the letter O in FIGURE 7, which is taken as the origin. The origin will vibrate with an amplitude plus or minus $\Delta Y$ along the longitudinal axis of the bellows. As long as the displacements $\pm \theta$, $\pm \Delta Y$, the speed of rotation, and the effective mass of the assembly are relatively small, the bellows 51 can accommodate the changes in plate displacement without breaking the hermetic seal between the sealing ring 54 and the rotating element 55. Nor will the sealing ring 54 and the rotating element 55 be destroyed by friction during the operation of the seal providing the forces are relatively small. However, in many installations operating at relatively low speeds the displacements $\pm \theta$, $\pm \Delta Y$, the speed of rotation, and the effective mass of the assembly are relatively small, the bellows 51 can accommodate the changes in plate displacement without breaking the hermetic seal between the sealing ring 54 and the rotating element 55. Nor will the sealing ring 54 and the rotating element 55 be destroyed by friction during the operation of the seal providing the forces are relatively small. However, in many installations operating at relatively low speeds the displacements $\pm \theta$, $\pm \Delta Y$, and the effective mass may become so great that the two sealing surfaces can not be kept in contact without requiring a bellows with a strong spring rate to force the sealing ring 54 to follow and remain in contact with the rotating element 55. Under these conditions, the life of the mating surfaces of the sealing ring 54 and the rotating element 55 will be short and it will be necessary to use the arrangement shown in FIGURE 8.

Referring to FIGURE 8 there is shown a bellows 56 having one end thereof secured at its center of pressure to a fixed support 52 and its opposite end secured to a sealing ring 57. The sealing ring 57 is provided with a concave seat 58 which rides upon a mating convex surface 59 on the rotating member 60. The convex surface 59 has a radius of curvature indicated at $R_0$. When the rotating member 60 rotates through an angle of plus or minus $\theta$ about the center of rotation 0, the two mating surfaces 58 and 59 can be held together with only a small displacement along the axis of the bellows 56, since the force required to keep the sealing ring 57 in contact with the rotating member 60, is proportional to the displacement. A reduction in this displacement allows a reduction to be made in the spring force. When the center of rotation of the rotating member 60, is shifted from $\theta$ to $\theta'$ the surface 59 would be concave and the seat 58 would be convex.

Where temperature changes are encountered two elements of a structure may be forced to make an axial movement of several inches. Forming a rotary seal between two such members presents certain problems particularly where bellows are used. The spring force exerted by bellows will increase with an increase in the displacement of its ends. The spring force exerted by a bellows on two sealing surfaces will undergo a change in values as the portions of the structure secured to the ends of the bellows are displaced. A solution to this problem is illustrated by the embodiment shown in FIGURE 9.

Referring to FIGURE 9 there is shown a bellows 61 secured at one end to the stationary structure 62 and at its other end to a structure 63 which undergoes a large axial displacement parallel to the axis of the bellows. A second bellows 64 is secured at one end to the axially movable, non-rotating structure 63 and at its other end to a sealing ring 65. The bellows 64 is of a construction similar to that illustrated in FIGURE 5. The ends of the bellows 64 are secured to the stationary portion 63 and the sealing ring 65 at the center of pressure. The sealing ring 65 rides upon the rotating member 66. Since all of the axial displacement brought about by temperature variations is absorbed by the first bellows 61, the axial displacement between the sealing ring 65 and the rotating member 66, will be limited to the small value initiated by the rotating element.

As the speed of the rotating element increases, the forces required to keep the sealing surface in contact with the rotating element will also be increased. These forces can be decreased for any particular speed of rotation by reducing the mass of the assembly which must oscillate to keep the sealing surfaces together. In the embodiment illustrated in FIGURE 10, there is shown an assembly designed for elements rotating at high speed. The bellows 67 shown in FIGURE 10 is formed of a plurality of plates 68 which are welded at their outer peripheries to rings 69 and on their inner peripheries to smaller rings 70. However, the bellows 67 differ from those heretofore described, in that the masses of the rings 69, 70, are greatest at the end nearest the fixed support 71 to which they are attached and smallest at the opposite end where they are secured to the sealing ring 72. The mass of the sealing ring 72 should be made as small as possible within the limits necessary to keep the surface of the ring 72 which mates with the rotating member 73 from warping. In FIGURE 10, the ring 72 is shown as a thin plate and to further reduce its mass it may be made of titanium or aluminum with the mating surface covered with some harder material.

As the speed of rotation increases the dynamic mass of the heavier parts of the bellows which must respond to the axial displacement increases, and the effective length of the bellows decreases until at very high speeds, the effective length of the bellows is reduced to the lower plate 68'. The portion of the assembly above the plate 68' has such a large dynamic mass that for all practical purposes it can be considered a rigid part of the assembly for high frequency axial displacements and the bellows will then behave as if it consisted of only a single plate 68' and a sealing ring 72.

While the embodiment shown in FIGURE 10 accomplishes a decrease in mass by reducing the mass of the rings throughout the bellows structure, the same effect can be accomplished by progressively increasing the thickness of the plates 68 from the fixed portion 71 to the sealing ring 72 as shown in FIGURE 11. Variations in the masses of the plates 68 can be accomplished by loading the plates with lumped masses, by coating the plates with lead, or by using plates with decreasing thicknesses from the top to the bottom of the assembly, or from the bottom of the assembly to the top. In the drawing it is assumed the shaking forces $F \sin wt$ are acting on the portion of the bellows nearest the sealing ring. If the shaking forces are applied from the end furthest from the sealing ring, the order of thickness should be inverted. It will be noted that the stiffness of plates 68' have been reduced in FIGURES 10 and 11, by actually making plates 68' thinner than plates 68. Since the support for the inner and outer peripheries of plates 68' are closer together than supports on plates 68, the stresses developed on plates 68' when the bellows is subjected to fluid pressure, can be made equal to or less than or even greater than the stresses in the plates 68 by controlling the thickness of the plates 68'.

Referring to FIGURE 12 there is shown a fragmentary view in cross section of still another form of bellows useful in connection with restricting flow of fluids between contacting surfaces in the presence of high pressure, temperature, vibration and other destructive forces. The bellows in FIGURE 12 consists of a series of plates welded or otherwise secured to separating rings 75, 76, at their inner and outer peripheries. Grooves 77 are cut into the rings 75, 76, to simplify the welding of the plates 74 to the said rings. The grooves 77 are necessary where the thickness of the rings 75, 76, is great compared with the thickness of the plates 74. By means of the grooves, a more uniform weld can be achieved. The inner edges of the rings 75, 76, are beveled as indicated at 78 to reduce the shearing stresses which are developed in the plates when pressure, either externally or internally applied, forces the said plates inwardly against the rings 75, 76.

At low pressures the shearing forces are not great and the bellows can be operated with either $P_1$ (the operating pressure) greater than $P_0$ (the original pressure) or $P_0$ greater than $P_1$. The bellows may be pressurized internally or externally without destruction. However, when the bellows shown in FIGURE 12 is subjected to high pressures, uneven spacing and warping takes place between the unsupported edges of the plates. Under conditions where the pressure differential between the internal and external pressures are several lbs. per sq. in. the bellows structure shown in FIGURE 13 is preferable. Under such circumstances it is necessary that the forces F exerted by the bellows on the end plates which are attached to the bellows will remain equal to the pressure differential $(P_1=P_0)$ multiplied by the effective area of bellows over the working range. The shape of the bellows plates shown in FIGURE 13 is an approximation of the ideal plate shape and this shape is close enough for all practical purposes to the ideal shape for bellows having the dimensions shown in the figure. The correct relation between the shape of the plates and dimensions of the bellows and the formation of these plates can be stated as follows:

(79.) When $D_i$ and $D_0$ are both large compared to $(D_i-D_0)$, that is as $$\frac{D_i-D_0}{D_i+D_0} \text{ approaches zero}$$

the curvature of the surfaces between 79 and 80, and 79 and 83, will approach segments of spherical surfaces, and when $$\frac{D_i-D_0}{D_i+D_0}=0$$

the ideal shape of these surfaces will be spherical.

(80.) When $(D_i-D_0)/(D_i+D_0)$ is large, the curvature of the surfaces between 79 and 80, and 79 and 83, will not be a segment of a spherical surface and the true shape can only be obtained by methods involving the formation of plates with fluid pressure.

(83.) When $(D_i-D_0)/(D_i+D_0)$ is small, the curvature of 79 between the inner surface of 83 and weld 81 can be a spherical surface.

(81.) When $(D_i-D_0)/(D_i+D_0)$ is large, the correct shape can not be calculated by the use of any known equations and must be formed by the use of fluid pressure.

The plate 79 in the bellows must be made thin enough to allow the bellows to be compressed or elongated, and because of this thinness the plates will stretch when subjected to high fluid pressures. In well designed bellows this stretching is only a small part of the strain required for the material to be stretched beyond its elastic limits. The strain imposed upon the bellows will cause a slight separation between the plate 79 and the ring 80, indicated as a dotted line 82 in FIGURE 13. As a result of this separation, the plates must rotate or are subjected to rotating forces or moments about the welds 81. The number of times the bellows can be elongated before failure can be increased by making the angle $\theta_0$, greater than 0 as shown in FIGURE 13. Since the life of the bellows will be greatest if the movement of the bellows is confined to extensions of the bellows from its free length, where the free length of the bellows is defined as the length of the bellows when it is free of exterior forces it will be apparent that the stresses set up in the weld 81, will be reduced by making the angle $\theta_0$ greater than zero.

At high pressures, the plate 79 will be forced tightly against the ring 80. Since frictional forces are developed between these contacting surfaces, the tension on the weld 81 can be reduced by making the angle $\theta_1$ less than zero. When the pressure differentials are small, $\theta_1$ should be made greater then 0, since the bellows may be extended so that contact is broken by the mating surfaces between the plate 79 and the ring 80 and also between the plate 79 and the internal ring 83. The spherical mating surfaces between the plates 79 and the internal rings 83 increase the stability of the bellows assembly so that the tendency of the plates to warp or develop uneven spacing at high pressure is clearly reduced.

The bellows 84 shown in FIGURE 14, is similar in principle to that described in connection with FIGURE 13, except that the bellows in FIGURE 14 is useful where the pressures are to be applied externally in contrast with the bellows of FIGURE 13 where the pressure is applied internally. The same advantages may be derived from the showing of FIGURE 14 as has been discussed in connection with FIGURE 13. Here again, the spherical mating surfaces between the plates 85 and the rings 86, 87, increases the stability of the bellows assembly.

In addition, with the bellows shown in FIGURES 13, 14, the stresses developed in the plates when subjected to pressure will be less then in other assemblies having equal dimensions throughout but having plates with curvatures which are not in agreement with the description hereinabove set forth. Therefore, for the same plate stress, when subjected to a given pressure, thinner plates can be used when the plates have curvatures which are in agreement with the description above referred to than for plates having any other shape. By decreasing the required thickness of the plates, the spring rate of the bellows also decreases. Small spring rates are highly desirable for the satisfactory operation of rotary seals.

By making $\theta_0$ and $\theta_1$ greater than or less than zero but not equal to zero, the movement of the bellows can be increased without reducing the life of the bellows, or the life of the bellows can be increased for any stroke.

In many installations it is necessary to control the natural frequency of vibration of the bellows. This can be done for any thickness of plates which are selected to give the correct spring rate by the mass of the rings 76, since the natural frequency $$f_n = \frac{1}{2\pi}\sqrt{\frac{k}{m}}$$

where $k$ is the effective spring rate of the bellows assembly and in the effective mass, which can be increased or decreased by increasing or decreasing the thickness $t$ shown in FIGURE 12.

In certain bellows formations, such as those shown in FIGURES 5 and 6, the lips of the bellows plates which are secured together by welding or soldering to form the outer and inner peripheries of the bellows make an angle of 90° with the longitudinal axis of the bellows. However, it is possible by generating suitable curves on the rings which hold the plates together to secure the lips of the bellows plates to the rings so that the lips and the rings conform to the same curvature. A construction of the type hereinabove referred to is shown in FIGURES 15, 16, 17. It has been found that such structures withstand greater pressures without deforming, have a lower spring rate and are capable of executing a greater number of elongations and compressions without failure. In the embodiment shown in FIGURE 15, the rings 88, 86, are formed to the curvature of the plates 87 which have been hydrostatically extended into the most desirable shapes to withstand internal pressure. In FIGURE 16, the rings 88, 89, have been machined to conform to the curvature of the plates 90 which have been shaped to withstand externally applied pressure.

The bellows shown in FIGURE 17 is formed of a plurality of relatively thin membranes 91, which are welded together at their inner and outer peripheries 92, 93, to rings 94, 95, respectively. The membranes 91 form a laminated plate structure rather than the single plate formation described in the preceding embodiment. The membranes 91 are formed so that they have the same curvature as has been described in connection with FIGURES 15, 16, and the rings 94, 95, are also machined to conform to the curvature of the membranes 91. The overall action of the pressurized bellows shown in FIGURE 17 will conform to that of the bellows shown in 16, except that the stiffness of the bellows formed in accordance with the embodiment shown in FIGURE 17, and its resistance to deformation and failure can be substantially increased over that of a single membrane structure.

Another problem of limiting the use of rotary seals at high speeds and in the presence of high ambient temperatures is the destructive overheating of the stationary sealing element which is in contact with the rotating portion of the seal. Referring to FIGURE 18, there is shown a rotary seal which is constructed to dissipate the heat generated between the portions of the seal which are in frictional contact with each other. The rotating element 96 in this embodiment of the invention has a sealing surface 97 and the blades 98 of a fan assembly secured thereto. The blades 98 extend over and around a metal container 99 which acts as a housing for a ring 100. The ring 100 may be made of carbon, or a mixture of carbon and other materials, although recent study has shown that the ring 100 may be made of any metal which can be ground to a flatness of 1 or 2 wave lengths of light. The ring 100 is held in plce within the container 99 by cementing or soldering it to the said container. The container 99 is secured to the bellows assembly 101, as by welding or the like, so that a cylindrical surface indicated by the letters C P in FIGURE 18, having a radius of $R_0$, will pass through the neighborhood of the center of the sealing surface on the ring 100. $R_0$ is known as the center of pressure of the bellows. In practice, the radius $R_0$ is sometimes less than the radius of the center of pressure of the bellows to accommodate for changes in the pressure differential. The bellows plates 103 nearest the sealing rings 100 may be made of the laminated construction shown in FIGURE 17. For small and rapid oscillations directed along the axis of the bellows the laminated construction will have a low spring rate. The remainder of the bellows which accommodates the large overall changes in length of the bellows may be made of thicker plates 104. The bellows plates 103, 104, are secured together by rings 105, 106, as hereinabove set forth so that the bellows assembly will exhibit the characteristics of a piston over a wide change in pressure differential. However, it is to be pointed out that the cooling structure illustrated and described in connection with FIGURE 18, may be used with any type of bellows.

The ring container 99 has a flat groove 107 which is cut into the inner face 108 thereof, (best shown in FIGURE 19). Outwardly extending flaps 109, are struck from the container 99 as shown in FIGURES 19 and 20, to provide a port for heat to escape from the sealing ring 100. The fan blades 98 rotating about the outside of the container 99, produce a suction on the opening 110 left by the flaps 109 in the body of the container 99. Since there are a plurality of flaps and openings 110, heat can be drawn out of the ring 100 by the fan blades 98 with great speed. Openings 111 are also provided in the body of the metal container 99 to draw cool air into the groove 107. There is therefore a constant change in air around the periphery of the sealing ring 100, which serves to cool it.

The embodiment illustrated in FIGURE 21 is similar to that shown in FIGURES 18, 19, 20, with the exception that the metal container 99 for the ring member 100 is provided with heat dissipating fins 112. The fins 112 serve as a heat exchange unit by means of which the fan blades 99 can draw the heat away from the rings 100.

From the foregoing it will be seen that there has been disclosed assemblies which are capable of maintaining a seal between surfaces, one of which is rotating and the other of which is stationary, while said surfaces are exposed to extreme conditions of heat, vibration, shock and the like. There has also been disclosed various forms of bellows structures useful in connection with such rotary seals.

Having thus fully described the invention, what is claimed as new and desired to be secured by Letters Patent of the United States, is:

1. A bellows having the performance characteristics of a piston comprising, a plurality of plates, a central opening in each of said plates, a first series of rigid ring-shaped members secured to said plates adjacent their inner peripheries to form pairs of plates and a second series of ring shaped members secured to alternate pairs of plates adjacent their outer peripheries to form a bellows, each of said plates having a parabolic shape between the first and second rings induced by subjecting the bellows to a pressure higher than its operating pressure.

2. A bellows according to claim 1 in which the shape of the rings adjacent the plates is such as to make an angle with the horizontal greater than 0°.

3. A bellows according to claim 1 in which the shape of each ring adjacent the plates conforms to the curvature of the plate to which it is secured.

4. A bellows according to claim 1 in which the plates in each pair are symmetrical about a plane through the first ring therebetween lying normal to the longitudinal axis of the bellows.

5. A bellows according to claim 1 in which the plates in each pair are curved in cross-section and have their curvatures opposite in sign symmetrical about a plane through the first ring therebetween lying normal to the longitudinal axis of the bellows.

6. A bellows having the performance characteristics of a piston comprising a plurality of plates, each of said plates being built up by welding a plurality of thin plate shaped members together at their ends, a central opening in each of said plates, a first series of rigid ring shaped members secured to said plates adjacent their inner peripheries to form pairs of plates and a second series of ring shaped members secured to alternate pairs of plates adjacent their outer peripheries to form a bellows, each of said plates having a parabolic shape between the first and second rings induced by subjecting the bellows to a pressure higher than its operating pressure.

References Cited in the file of this patent

UNITED STATES PATENTS

| | | |
|---|---|---|
| 2,115,419 | Dreyer | Apr. 26, 1938 |
| 2,223,691 | Lockwood | Dec. 3, 1940 |
| 2,242,604 | Wells | May 20, 1941 |
| 2,673,748 | Shaw | Mar. 30, 1954 |
| 2,770,259 | Zallea | Nov. 13, 1956 |
| 2,794,659 | Bily | June 4, 1957 |
| 2,797,112 | Ziebold | June 25, 1957 |
| 2,818,636 | Fentress et al. | Jan. 7, 1958 |
| 2,840,394 | Rohr | June 24, 1958 |

FOREIGN PATENTS

| | | |
|---|---|---|
| 12,152 | Great Britain | May 19, 1911 |
| 448,701 | Canada | May 25, 1948 |
| 720,100 | Great Britain | Dec. 15, 1954 |
| 721,241 | Great Britain | Jan. 19, 1955 |